(No Model.)
J. G. BESTGEN.
SCISSORS OR SHEARS.
No. 538,032. Patented Apr. 23, 1895.
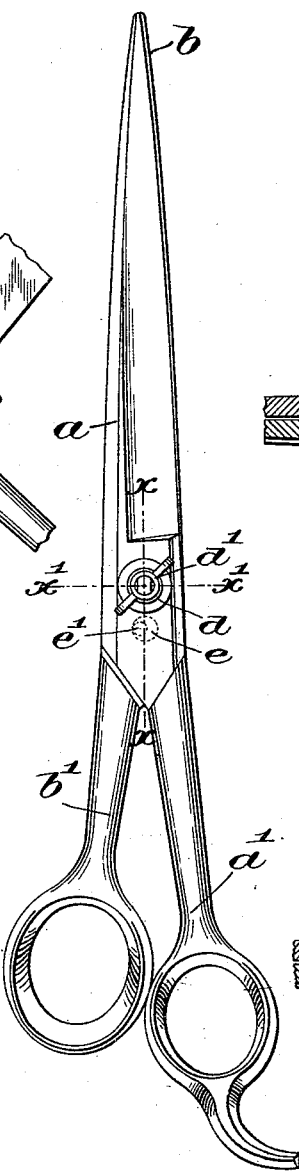
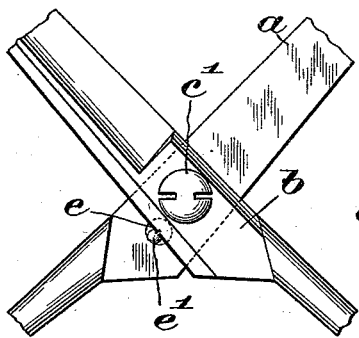
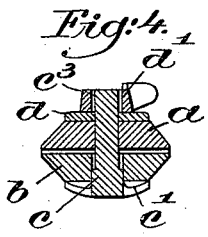
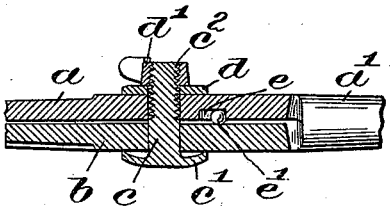
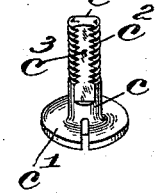
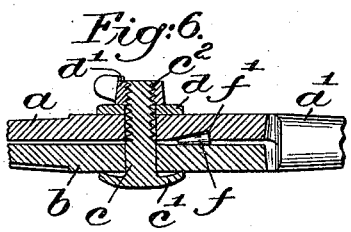
Witnesses.
A. C. Harmon
Fred S. Greenleaf.
Inventor:
John G. Bestgen
by Crosby & Gregory
attys.

UNITED STATES PATENT OFFICE.

JOHN G. BESTGEN, OF SOMERVILLE, MASSACHUSETTS.

SCISSORS OR SHEARS.

SPECIFICATION forming part of Letters Patent No. 538,032, dated April 23, 1895.

Application filed June 11, 1894. Serial No. 514,119. (No model.)

*To all whom it may concern:*

Be it known that I, JOHN G. BESTGEN, of Somerville, county of Middlesex, State of Massachusetts, have invented an Improvement in Scissors or Shears, of which the following description, in connection with the accompanying drawings, is a specification, like letters on the drawings representing like parts.

This invention has for its object the production of scissors or shears, the blades of which are provided with a rolling bearing, whereby friction is greatly reduced and the operation of the blades is made very easy, means being also provided for securing a slight spring action of the blades.

In accordance therewith my invention consists in scissors or shears comprising two blades, a pivot having a threaded shank extended therethrough and provided with a slotted concavo-convex head adapted to bear upon the outer face of the adjacent blade, an adjusting thumb nut screwed upon the threaded shank beyond the other blade, and a friction roll free to move in a recess in the inner face of one blade and held in place by the inner face of the other blade, substantially as will be described.

Other features of my invention will be hereinafter described and particularly pointed out in the claim.

Figure 1 is a plan view of a pair of scissors or shears embodying my invention, the blades being shown as closed. Fig. 2 is a partial under side view of the same, with the blades opened. Fig. 3 is a longitudinal sectional view taken on the line $x-x$, Fig. 1. Fig. 4 is a transverse section on the line $x'-x'$, Fig. 1. Fig. 5 is a detached perspective view of the pivot; and Fig. 6 is a sectional view of the scissors or shears showing a modified form of bearing.

I have herein shown the scissors or shears as comprising blades $a$ and $b$, provided respectively with usual handles $a'$ and $b'$, and having suitable openings for the pivot, to be described.

Instead of pivotally connecting the blades by a headed rivet, or by an ordinary screw and nut, I extend through the openings in the blades a pivot $c$, preferably having a concavo-convex slotted head $c'$, and a threaded shank $c^2$, slabbed off for a portion of its length, as at $c^3$, as best shown in Figs. 4 and 5. The concavo-convex head $c'$ is adapted to bear against the outer face of the blade $b$, see Figs. 2 to 4, the blade being free to rotate on the cylindrical portion of the pivot shank adjacent to the head, while the slabbed portion of the shank $c^2$ enters the suitably shaped opening in the blade $a$, to be turned therewith. A washer $d$, or it may be a split or spring washer of well-known construction, is slipped over the projecting shank, and a thumb nut $d'$ is then screwed upon the threaded shank, bearing against the washer $d$. When the thumb nut $d'$ is screwed up against the washer $d$, the head $c'$ of the pivot is drawn inward against the outer side of the blade $b$, and presses thereupon in a yielding manner, owing to its concavo-convex form and the slots therein, so that the blades are held together at their fulcrum point, in a yielding manner. If a slit spring washer is used adjacent the thumb nut the yielding action of the pivot is increased. The pressure is adjusted by means of the thumb nut $d'$, as will be obvious from the foregoing.

In order to reduce the friction and impart easy movement to the blades, I have interposed a rolling bearing between the adjacent inner faces of the blades, over which the bearing rolls. The inner face of one of the blades has a recess $e$ formed therein, see Figs. 1, 2 and 3, of sufficient size to receive loosely a ball or roll $e'$, the depth of the recess being less than the diameter of the ball. The ball or roll $e'$ is retained in the recess by the inner face of the other blade, the ball rolling upon the blades when they are turned about the pivot, thereby forming a rolling bearing for the blades, and reducing the friction to a minimum.

It will be seen that the rolling bearing is located at the rear of the pivotal point of the blades, so that they are tilted longitudinally toward each other, to bring the cutting edges of the blades into close contact as they are closed, thereby insuring a clean, true cut without binding the blades or cramping the fingers of the operator.

The pressure upon the blades is quickly adjusted by means of the thumb nut $d'$, according to the nature of the material to be cut.

If desired more than one ball may be used, the recess being made of sufficient size to receive them.

In Fig. 6 I have shown a modified form of bearing, wherein a conical roll $f$ is held in a suitably shaped recess $f'$ in one of the blades, the inner faces of the blades rolling on the friction roll, as hereinbefore set forth.

I claim—

The herein described scissors or shears, comprising two blades, a pivot having a threaded shank extended therethrough and provided with a slotted concavo-convex head adapted to bear upon the outer face of the adjacent blade, an adjusting thumb nut screwed upon the threaded shank beyond the other blade, and a friction roll free to move in a recess in the inner face of one blade and held in place by the inner face of the other blade, substantially as described.

In testimony whereof I have signed my name to this specification in the presence of two subscribing witnesses.

JOHN G. BESTGEN.

Witnesses:
  GEO. W. GREGORY,
  JOHN C. EDWARDS.